May 14, 1929.   R. G. WARREN   1,712,535
AUXILIARY RESERVOIR BLEEDING SYSTEM
Filed July 11, 1927   2 Sheets-Sheet 1
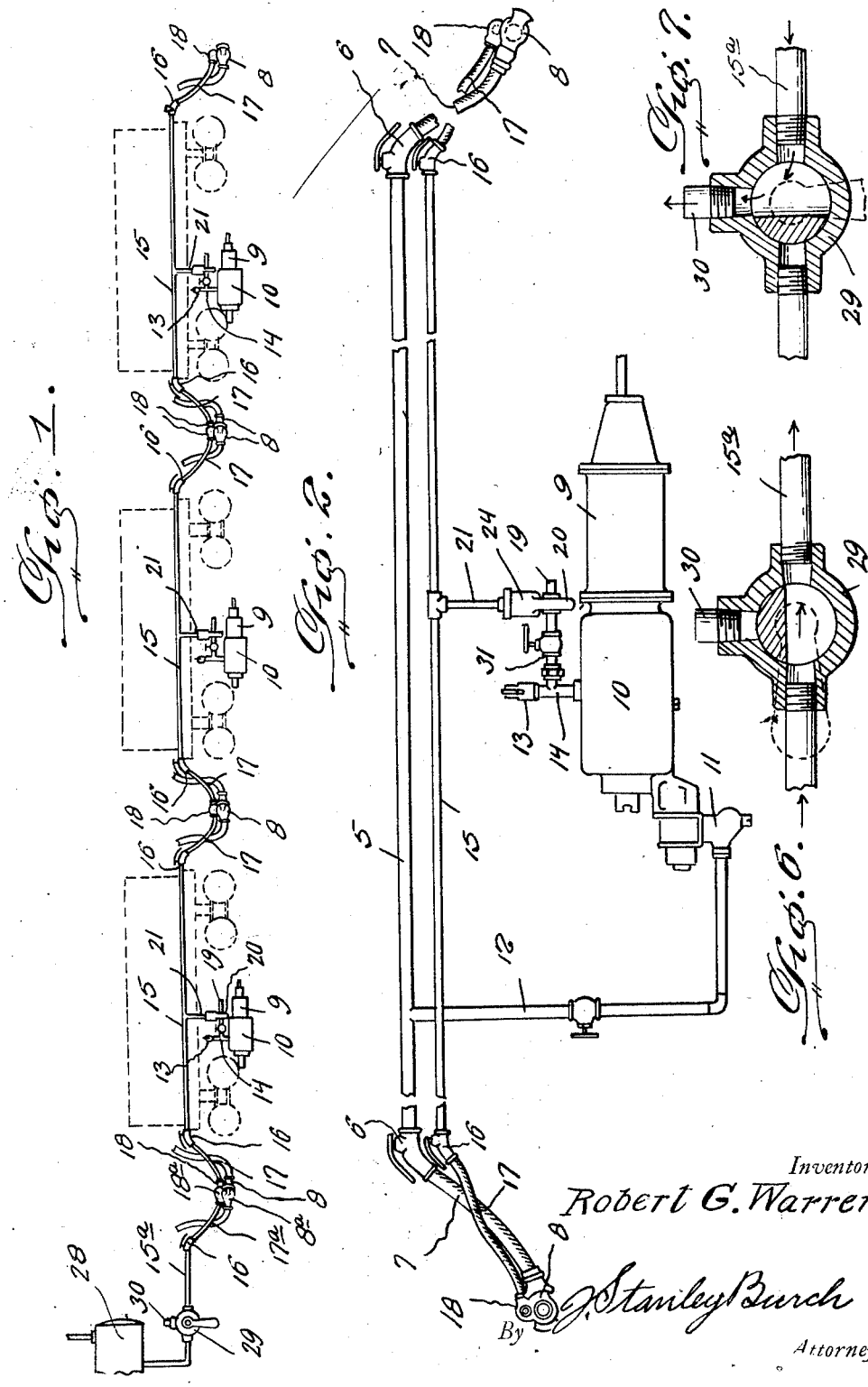
Inventor
Robert G. Warren,
By Stanley Burch
Attorney May 14, 1929.  R. G. WARREN  1,712,535
AUXILIARY RESERVOIR BLEEDING SYSTEM
Filed July 11, 1927   2 Sheets-Sheet 2
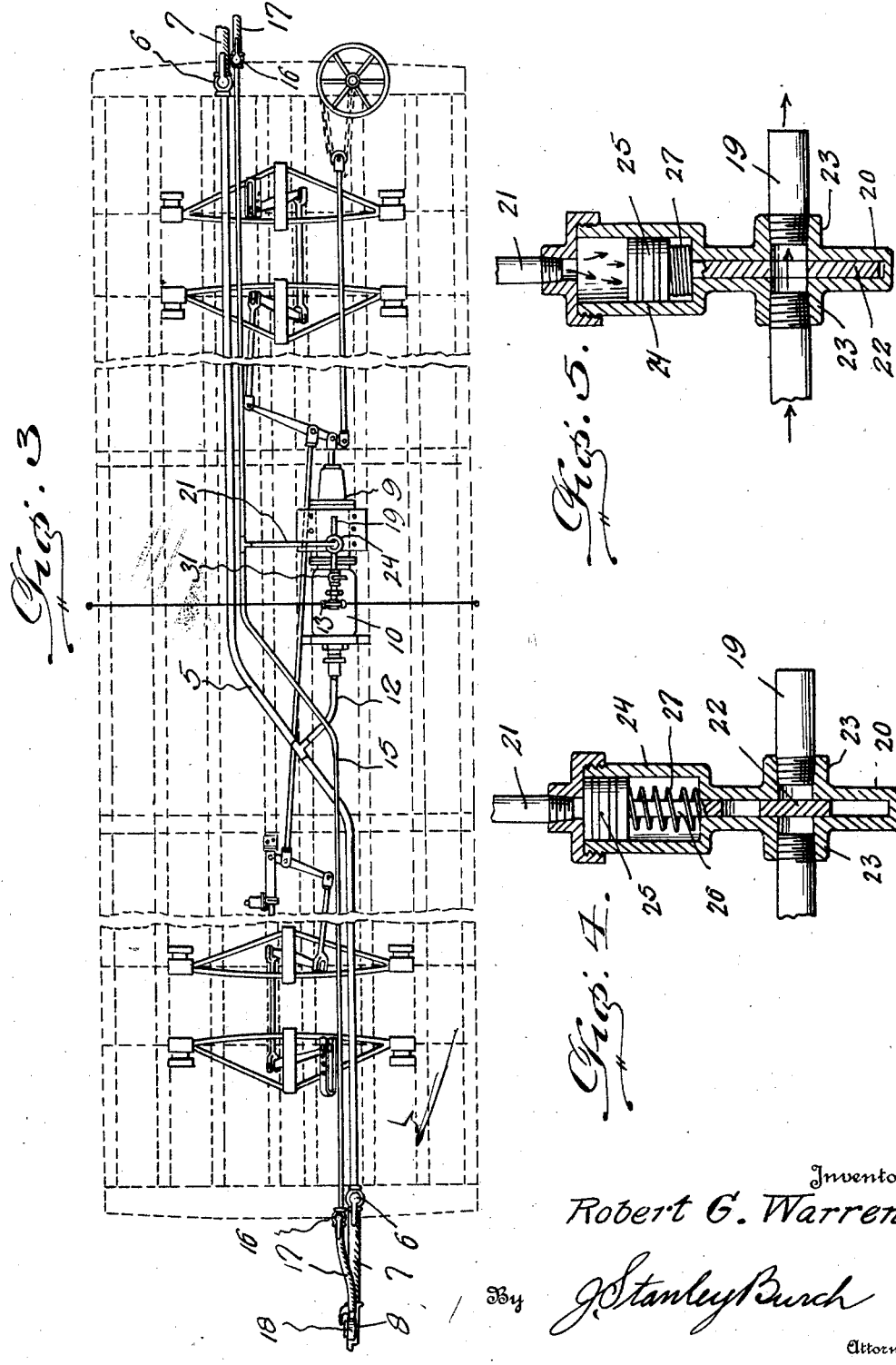
Inventor
Robert G. Warren,
By J. Stanley Burch
Attorney Patented May 14, 1929.

1,712,535

UNITED STATES PATENT OFFICE.

ROBERT G. WARREN, OF WINSLOW, ARIZONA.

AUXILIARY RESERVOIR BLEEDING SYSTEM.

Application filed July 11, 1927. Serial No. 204,862.

This invention relates to air brake systems for railway trains, and particularly to an improved bleeder system for the auxiliary reservoirs.

The primary object of the present invention is to provide means for enabling the engineer of a locomotive to readily and quickly cause the air to be exhausted from the auxiliary reservoirs of the cars of a train, whereby the brakes of the cars are released for permitting the cars to be moved.

In air brake systems as used at the present time, the brakes of the cars remain applied, due to the air pressure in the auxiliary reservoirs of the cars. Before the cars can be moved, the bleeder valve of the reservoir of each car must be manually opened so as to exhaust the air and release the brakes. As the bleeder valves must be held open until all of the air is exhausted or bled from the reservoirs, much time is consumed and the trainmen are prevented from attending to other duties during this period of time.

The present invention aims to overcome these objections and disadvantages by providing pressure operated means under control of the engineer of an engine for simultaneously and quickly bleeding the air from the auxiliary reservoirs of a train of cars directly to the atmosphere.

A further object is to provide each car with a supplemental air pressure line having hose connections and shut-off valves at each end, whereby the supplemental air lines of a train of cars may be coupled and the rear end of the supplemental pressure line of one end car may be closed, and to provide the auxiliary reservoir of each car with an exhaust or bleeder pipe normally closed by means of a spring-seated valve adapted to be opened by pressure and operatively associated with said supplemental air pressure line, whereby, upon introduction of air under pressure into the supplemental pressure line of the other end car of the train, the exhaust controlling valves of the auxiliary reservoirs of all the cars may be simultaneously opened for quickly bleeding the air from the reservoirs and releasing the brakes.

This invention further contemplates the provision of a supplemental air pressure line on the locomotive communicating with a source of air under pressure and having a hose connection for coupling to the supplemental line of an end car of a train, means being provided to manually control the flow of air from the source into the supplemental lines, whereby the release of the brakes may be readily effected at the will of the engineer.

The invention consists of the novel form, combination and arrangement of parts hereinafter more fully described, shown in the accompanying drawings and claimed.

In the drawings:

Figure 1 is a somewhat diagrammatic side elevation of the supplemental air pressure lines of a train of cars and a locomotive in coupled relation, and showing the auxiliary reservoirs provided with bleeder or exhaust pipes having normally closed pressure-opened control valves operatively associated with said lines.

Figure 2 is an enlarged side elevation of the portion of an air brake system for one car and the portion of the present bleeder system for such car.

Figure 3 is a top plan view of the construction of Figure 2, together with parts of the brake mechanism of the car, the car body being also indicated by dotted lines.

Figure 4 is an enlarged sectional view of the spring-closed pressure operated or opened valve employed for the bleeder or exhaust pipe of each auxiliary reservoir, the movable member of the valve being in normal closed position.

Figure 5 is a view similar to Figure 4 with the movable valve member in open position.

Figure 6 is a sectional view of the engineer's valve for controlling the flow of air from the source into the supplemental air pressure lines of the cars, the movable member of the valve being in the position to permit the flow of air into the supplemental lines of the cars, and Figure 7 is a view similar to Figure 6 with the movable valve member in position to cut off the supply of air to the supplemental lines and to exhaust the air therefrom.

Referring more in detail to the drawings, 5 indicates the usual train line of a car having angle cocks 6 and flexible hose sections 7 at its ends, the latter having the usual hose coupling sections 8 whereby the train lines of a plurality of cars are coupled together. Each car also has the usual brake cylinder 9 and auxiliary reservoir 10, the latter having the usual triple valve 11 associated therewith and placed in communication with the train line 5 by means of branch pipe 12. The usual bleeder valve 13 is preferably provided on the upper end of a pipe 14.

In accordance with the present invention, each car is provided with a supplemental air pressure train line 15 having end cut-off valves 16, and end hose sections 17 connected to auxiliary coupling heads 18 rigid with the train line hose coupling sections 8. In this way, adjacent ends of both air lines may be connected by a single coupling operation. The auxiliary reservoir 10 has a bleeder or exhaust pipe including a length of pipe 19 communicating with pipe 14 and in which is interposed a spring closed valve 20 adapted to be opened by air pressure and placed in operative communication with the line 15 by means of branch pipe 21.

The valve 20 may be of any suitable or preferred construction, but is shown as embodying a sliding apertured gate 22 movable in a casing having opposed ports 23 and formed with a cylinder 24 in which is movable a piston 25 connected to the gate 22 by a stem 26. The stem 26 is surrounded by a helical compression spring 27 arranged between the piston 25 and the bottom of cylinder 24 to normally elevate the gate 22 to closed position. The branch pipe 21 communicates with the top of cylinder 24 so that air under pressure supplied therethrough will force the piston downwardly to open the gate 22 as shown in Figure 5, thereby permitting the air to freely bleed to the atmosphere from the reservoir 10 through pipe 19.

In order to permit the engineer to introduce air under pressure into the coupled supplemental air lines 15 for bleeding the reservoirs and releasing the brakes of the cars, the locomotive has a supplemental air line 15ª communicating with a suitable source of compressed air, as at 28, and having an end hose section 17ª connected to the auxiliary coupling head 18ª of the locomotive train line hose coupling section 8ª whereby the locomotive line 15ª may be coupled to one end of the supplemental air line 15 of a car. The supplemental air line 15ª has a valve 29 therein which may be of the turn plug type as shown in Figures 6 and 7, including a rotatable core positionable, as in Figure 6, to open the supplemental air line 15ª or as shown in Figure 7 to close the supplemental air line 15ª and place the supplemental air lines 15 in communication with the atmosphere through a vent port 30 of the valve 29. Naturally, when the supplemental air line 15ª is opened, the valves 20 are opened to bleed the reservoirs and release the brakes, while the valves 20 are allowed to close again by exhausting the air from the supplemental air lines 15 through vent port 30 of valve 29. An emergency cut-off valve 31 is preferably employed in exhaust pipe 19.

Minor changes may be made without departing from the spirit and scope of the invention as claimed.

What I claim as new is:

1. The combination with an air brake system, of a bleeder valve connected to the auxiliary reservoir, a supplemental air pressure train line, and pressure operated means operatively associated with said supplemental air pressure line for opening said bleeder valve.

2. The combination with an air brake system, of a bleeder valve connected to the auxiliary reservoir, a supplemental air pressure car train line, and means whereby introduction of air under pressure into said supplemental train line will automatically bleed the air from the auxiliary reservoir.

3. The combination with an air brake system, of an exhaust pipe for the auxiliary reservoir, a supplemental train line, and means including a spring closed and pressure opened valve for opening said exhaust pipe upon introduction of air under pressure into said supplemental train line.

4. The combination with an air brake system, of a bleeder valve connected to the auxiliary reservoir, a supplemental air pressure car train line, and means whereby introduction of air under pressure into said supplemental train line will automatically bleed the air from the auxiliary reservoir, and cut-off valves and hose connections for the ends of said supplemental car train line.

5. The combination with an air brake system, of a bleeder valve connected to the auxiliary reservoir, a supplemental air pressure car train line, means whereby introduction of air under pressure into said supplemental train line will automatically bleed the air from the auxiliary reservoir, cut-off valves and hose connections on the ends of said supplemental car train line, a supplemental locomotive train line communicating with a source of supply of air under pressure and having a hose connection, and a valve in the supplemental locomotive train line for selectively introducing air under pressure into said supplemental car train line or exhausting the air therefrom.

6. The combination with an air brake system, of an exhaust pipe for the auxiliary reservoir, a supplemental train line, means including a spring closed and pressure opened valve for opening said exhaust pipe upon introduction of air under pressure into said supplemental train line, said exhaust pipe having a branch provided with a manually operable bleeder valve.

7. The combination with an air brake system, of an exhaust pipe for the auxiliary reservoir, a supplemental train line, and means including a spring closed and pressure opened valve for opening said exhaust pipe upon introduction of air under pressure into said supplemental train line and an emergency cut-off valve in the exhaust pipe between the spring closed valve and the auxiliary reservoir.

8. The combination with an air brake system, of an exhaust pipe for the auxiliary reservoir, a supplemental train line, means including a spring closed and pressure opened valve for opening said exhaust pipe upon introduction of air under pressure into said supplemental train line, and an emergency cut-off valve in the exhaust pipe between the spring closed valve and the auxiliary reservoir, said exhaust pipe having a branch between the emergency cut-off valve and the reservoir equipped with a manually operable bleeder valve.

In testimony whereof I affix my signature.

ROBERT G. WARREN.